(12) United States Patent
Handa et al.

(10) Patent No.: US 9,482,253 B2
(45) Date of Patent: Nov. 1, 2016

(54) PIPE SUPPORTING DEVICE FOR CONSTRUCTION MACHINE

(71) Applicant: KOBELCO CONSTRUCTION MACHINERY CO., LTD., Hiroshima-shi (JP)

(72) Inventors: Isao Handa, Hiroshima (JP); Kyohei Kosaka, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/739,400

(22) Filed: Jun. 15, 2015

(65) Prior Publication Data

US 2015/0369396 A1    Dec. 24, 2015

(30) Foreign Application Priority Data

Jun. 23, 2014   (JP) .................. 2014-127950

(51) Int. Cl.
*F16L 3/00* (2006.01)
*F16B 5/08* (2006.01)
*E02F 9/00* (2006.01)
*E02F 9/22* (2006.01)

(52) U.S. Cl.
CPC . *F16B 5/08* (2013.01); *E02F 9/00* (2013.01); *E02F 9/2275* (2013.01)

(58) Field of Classification Search
CPC .............. F16L 3/01; F16L 3/08; F16B 5/08; E02F 9/00
USPC ...................... 248/65, 71, 49, 68.1; 414/722
See application file for complete search history.

(56) References Cited

U.S. PATENT DOCUMENTS 3,851,672 A * 12/1974 De Vincent ........... B60T 17/046
                                                      138/106
5,222,701 A *  6/1993 Rowland .............. B65H 75/366
                                                      248/222.13

(Continued)

FOREIGN PATENT DOCUMENTS

EP       1 607 528 A2    12/2005
EP       2 573 277 A1     3/2013

(Continued)

OTHER PUBLICATIONS

Extended European Search Report issued Nov. 18, 2015 in Patent Application No. 15172639.5.

*Primary Examiner* — Gwendolyn Baxter
(74) *Attorney, Agent, or Firm* — Oblon, McClelland, Maier & Neustadt, L.L.P.

(57) ABSTRACT

A pipe supporting device includes a support portion for supporting a hydraulic pipe along an axis of the hydraulic pipe extending along a length of a boom, and a weld portion to be connected with an outer surface of the boom by fillet welding. The weld portion has a plurality of peripheral surfaces, the plurality of peripheral surfaces including: a pair of opposite perpendicular standing surfaces and extending in a direction substantially perpendicularly intersecting a first stress direction along the axis of the hydraulic pipe; and a pair of oblique standing surfaces extending from respective leading ends of the pair of opposite perpendicular standing surfaces to join each other. Each of the oblique standing surfaces extends in a direction oblique to the first stress direction and joins the corresponding one of the perpendicular standing surfaces at an acute angle.

7 Claims, 7 Drawing Sheets

(56) References Cited

U.S. PATENT DOCUMENTS

| | | | |
|---|---|---|---|
| 8,523,120 B2* | 9/2013 | Asano | E02F 9/2275 248/637 |
| 8,770,537 B2* | 7/2014 | Go | E02F 9/2275 212/347 |
| 2009/0014615 A1* | 1/2009 | Hausladen | B08B 9/426 248/311.2 |

FOREIGN PATENT DOCUMENTS

| | | | |
|---|---|---|---|
| JP | 5-10547 U | | 2/1993 |
| JP | 2004-169864 A | | 6/2004 |
| JP | 2007-120194 A | | 5/2007 |
| JP | 4704888 | | 6/2011 |
| JP | 2011149212 | * | 8/2011 |
| KR | 20110045363 | * | 5/2011 |

* cited by examiner

PIPE SUPPORTING DEVICE FOR CONSTRUCTION MACHINE

TECHNICAL FIELD

The present invention relates to a pipe supporting device for supporting a hydraulic pipe provided in a construction machine.

BACKGROUND ART

Conventionally, there are known construction machines including a machine body, an attachment mounted on the machine body pivotally around a horizontal axis, and a pipe supporting device for supporting a hydraulic pipe provided on the attachment.

For example, a pipe supporting device disclosed in Japanese Patent Publication No. 4704888 (hereinafter referred to as "Patent Literature 1") includes a plate connected with an upper surface of an arm of a hydraulic excavator by welding, and a pipe clamp provided on the plate.

FIGS. 11 and 12 illustrate a state of the arm and the plate connected with each other by welding as disclosed in Patent Literature 1.

As shown in FIG. 11, the plate 21 is connected with an upper surface of a top plate 20 of the arm by fillet welding. Specifically, the plate 21 is connected to the top plate 20 by means of a weld bead 22 provided along mutually adjacent side surfaces 21a and 21b, as shown in FIG. 12. The side surfaces 21a and 21b of the plate 21 join each other at an angle 21c greater than 90 degrees, i.e. at an obtuse angle.

When the arm is operated, a stress occurs in the top plate 20 of the arm in a direction along the length of the arm (hereinafter, the direction of the stress will be referred to as a first stress direction D7). On the other hand, another stress may occur in the top plate of the arm in a second stress direction D8 perpendicularly intersecting the first stress direction D7 due to a reaction force received from a cylinder for driving a bucket when the arm is operated.

Here, the side surface 21a of the plate 21 extends in the first stress direction D7, i.e. in the direction perpendicularly intersecting the second stress direction D8. Therefore, the strength of the weld formed at the side surface 21a is liable to be insufficient against the stress occurring in the second stress direction D8.

Further, stress concentration is liable to occur at the weld formed at the corner between the side surfaces 21a and 21b. Therefore, the strength of the weld formed at the corner is also liable to be insufficient.

On the other hand, the side surface 21b of the plate 21 extends obliquely to both of the stress directions D7 and D8. This makes, among stress components acting in the stress directions D7 and D8, the stress component acting in a direction perpendicularly intersecting the side surface 21b smaller. Therefore, the strength of the weld formed at the side surface 21b is greater than that at the other part.

For the reasons described above, it is necessary to grind a perpendicular portion 22a (the hatched portion in FIG. 12) and a corner portion 22c (the cross-hatched portion in FIG. 12) of the bead 22 by a grinder G in order to improve the weld strength of the perpendicular portion 22 provided along the side surface 21a and the corner portion 22c provided along the corner.

Specifically, as shown in FIG. 11, the bead 22 is ground from a toe of weld of the bead 22 (perpendicular portion 22a and the corner portion 22c) over a predetermined region level so that the cross-sectional area of the bead 22 gradually increases in the second stress direction D8.

In this case, as shown in FIG. 12, the grinder G is caused to reciprocate in a grinding direction D5 parallel to the second stress direction D8 while moving in a movement direction D6 extending along the perpendicular portion 22a, to thereby grind the perpendicular portion 22a and the corner portion 22c.

On the other hand, because the strength of the weld formed at the side surface 21b extending obliquely to both of the stress directions D7 and D8 is greater than that at each of the perpendicular portion 22a and the corner portion 22c as mentioned above, grinding of the oblique portion 22b of the bead 22 provided along the side surface 21b is omitted.

Therefore, the grinding using the grinder G is performed from the perpendicular portion 22a to a terminating end 23c defined by a boundary between the corner portion 22c and the oblique portion 22b.

At this time, if a step is formed between the corner portion 22c and the oblique portion 22b at the terminating end 23c, stress concentration will occur thereat. In order to prevent this situation, it is necessary to perform a finishing treatment on the terminating end 23c so that the corner portion 22c and the oblique portion 22b join each other at the terminating end 23c smoothly in the second stress direction D8.

However, in the plate 21 disclosed in Patent Literature 1, the side surfaces 21a and 21b join each other at the obtuse angle. Therefore, when the grinder G is moved in the grinding direction D5 in order to perform the finishing treatment on the terminating end 23c, the grinder G is liable to come into contact with the side surface 21b located in the middle of the path of movement in the grinding direction D5, as shown by the reference numeral P in FIG. 12.

This makes it difficult to perform the finishing treatment on the terminating end 23c of the grinding.

SUMMARY OF INVENTION

The present invention has an object of providing a pipe supporting device which allows a finishing treatment to be easily performed on a terminating end of grinding performed on a weld formed on an attachment.

In order to achieve this object, the present invention provides a pipe supporting device for use in a construction machine including a machine body, an attachment mounted on the machine body pivotably around a horizontal axis, and a hydraulic pipe extending along a length of the attachment, the pipe supporting device comprising: a support portion for supporting the hydraulic pipe along an axis of the hydraulic pipe extending along the length of the attachment; and a weld portion joining the support portion and to be connected with an outer surface of the attachment by fillet welding, wherein the weld portion has a plurality of peripheral surfaces standing on the outer surface of the attachment for the fillet welding, the plurality of peripheral surfaces including: a pair of opposite perpendicular standing surfaces extending in a direction substantially perpendicularly intersecting the axis of the hydraulic pipe; and a pair of oblique standing surfaces extending from respective leading ends of the pair of opposite perpendicular standing surfaces to join each other, each of the oblique standing surfaces extending in a direction oblique to the axis of the hydraulic pipe and joining the corresponding perpendicular standing surface at an acute angle.

According to the present invention, it is possible to easily perform a finishing treatment on a terminating end of grinding performed on a weld formed on an attachment.

These and other objects, features and advantages of the present invention will become more apparent upon reading the following detailed description along with the accompanying drawings.

DESCRIPTION OF EMBODIMENTS

Hereinafter, embodiments of the present invention will be described with reference to the accompanying drawings. It should be noted that the following embodiments illustrate some examples of the invention, and not delimit the protection scope of the invention.

First Embodiment

FIGS. 1 to 8

Figure 1:
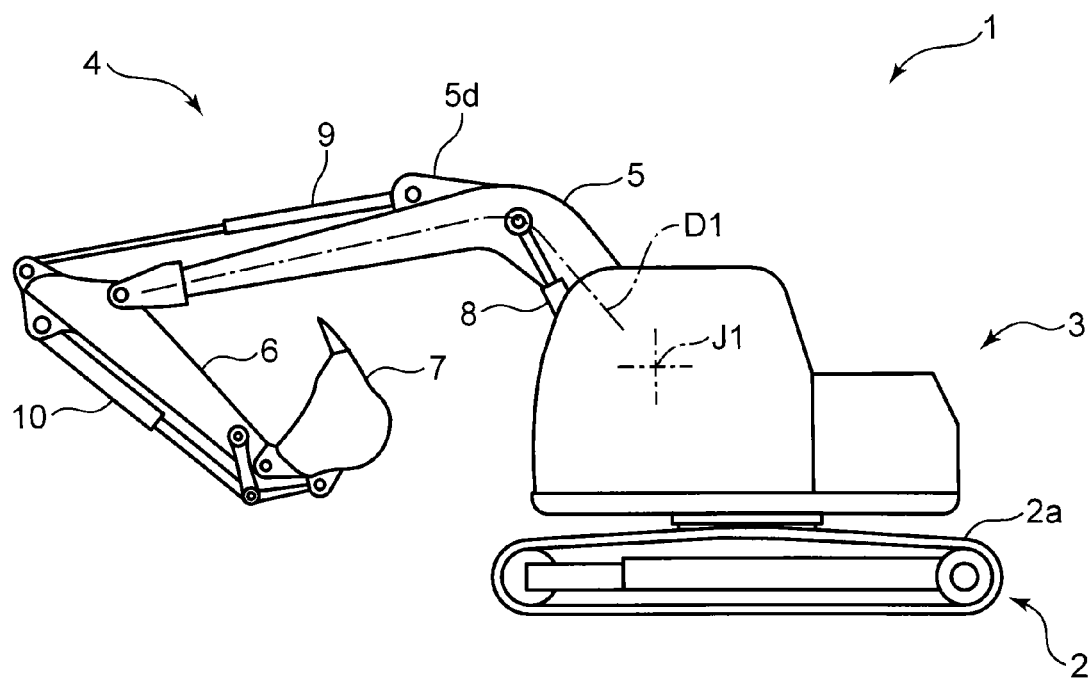
FIG. 1 is a side view showing an overall configuration of a hydraulic excavator according to a first embodiment of the present invention.
Figure 2:
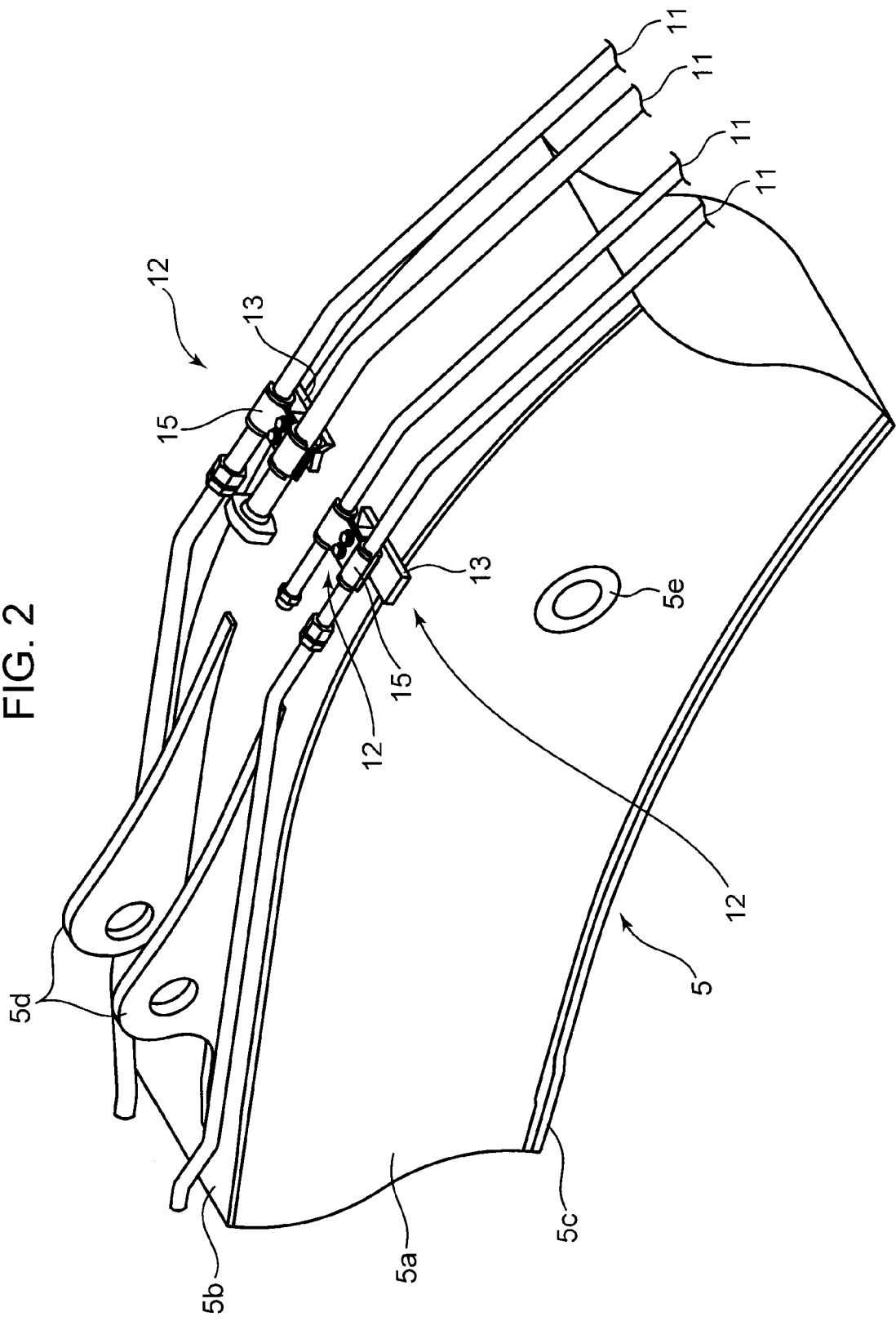
FIG. 2 is an enlarged perspective view of a part of a boom shown in FIG. 1.

With reference to FIGS. 1 and 2, a hydraulic excavator 1, which exemplifies a construction machine according to an embodiment of the present invention, includes a lower travelling body 2 having a pair of crawlers 2a, an upper slewing body 3 pivotally mounted on the lower travelling body 2, a working machine 4 movably mounted on the upper slewing body 3 and a pair of pipe supporting devices 12 (see FIG. 2) supporting the hydraulic pipes 11 (see FIG. 2) provided in the working machine 4. The lower travelling body 2 and the upper slewing body 3 constitute a machine body pivotally supporting a boom 5 described later.

The working machine 4 includes the boom 5 (attachment) mounted to the upper slewing body 3 pivotally around a horizontal axis J1, an arm 6 mounted to a distal end of the boom 5 pivotally around a horizontal axis, and a bucket 7 mounted to a distal end of the arm 6 pivotally around a horizontal axis.

Further, the working machine 4 includes a boom cylinder 8 for driving the boom 5 to move upward and downward with respect to the upper slewing body 3, an arm cylinder 9 for driving the arm 6 to pivot with respect to the boom 5, and a bucket cylinder 10 for driving the bucket 7 to pivot with respect to the arm 6.

The boom 5 is in the form of a cylinder having a closed section on a plane perpendicularly intersecting a length D1 of the boom 5. Specifically, the boom 5 includes a pair of side plates 5a (only one of which is shown in FIG. 2) facing each other in the direction perpendicularly intersecting the length D1, a top plate 5b connecting respective upper ends of the side plates 5a, and a bottom plate 5c connecting respective lower ends of the side plates 5a. In other words, the length D1 is on a vertically center line of the boom 5 connecting centers between the top plate 5b and the bottom plate 5c.

Further, the boom 5 includes a boss 5e to which a distal end of the boom cylinder 8 attached, and a pair of brackets 5d to which a base end of the arm cylinder 9 attached. The boss 5e passes through the opposite side plates 5a, and is connected with the opposite side plates 5a by welding. The brackets 5d stand on the top plate 5b and extend along the length D1, the brackets 5d facing each other in the direction perpendicularly intersecting the length D1 (in the direction of the opposite side plates 5a facing each other).

When the working machine 4 performs excavation, a load acts on the distal end of the boom 5 and the boom 5 is thus subject to bending. Consequently, a stress occurs in the top plate 5b of the boom 5 in a first stress direction D3 (see FIG. 5) along the length D1.

Further, in the excavation, a connecting pin which connects the arm cylinder 9 and the brackets 5d receives a force in the direction along the length D1, the force being a reaction force to a pulling movement of the arm 6 (extension of the arm cylinder 9). Here, respective lower ends of the brackets 5d are secured on the top plate 5b. Therefore, when the connecting pin receives the force, the brackets 5d deform (incline) in such a way that respective upper ends of the brackets 5d move away from each other. The portion of the top plate 5b that is between the opposite brackets 5d (a widthwise middle portion of the top plate 5b) bulges upward so that a bending deformation is occur on the top plate 5b. As a result, a tensile stress occurs in the top plate 5b in a second stress direction D4 (see FIG. 5) perpendicularly intersecting the length D1.

The hydraulic pipes 11 are disposed on the top plate 5b of the boom 5 and along the length D1, and are respectively connected to the arm cylinder 9 and the bucket cylinder 10.

The pair of pipe supporting devices 12 is disposed in widthwise symmetry as shown in FIG. 2. Hereinafter, accordingly, only the pipe supporting device 12 on the left side will be described.

Figure 3:
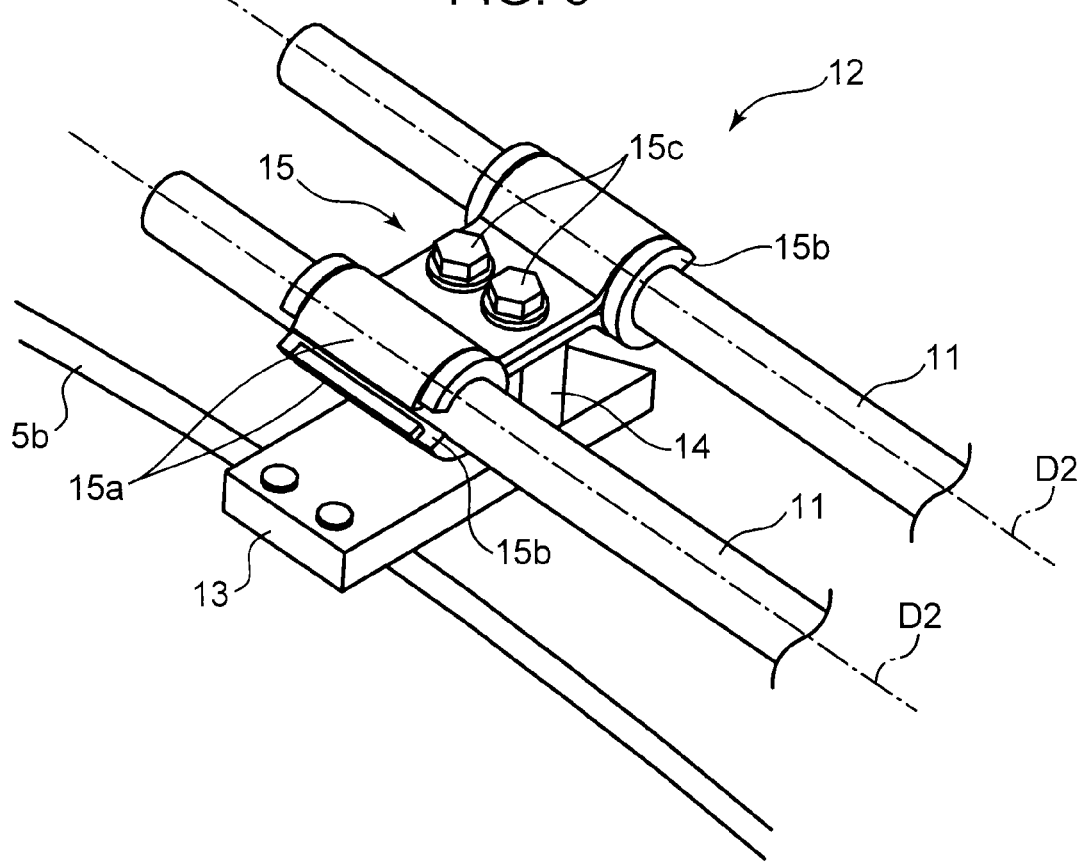
FIG. 3 is an enlarged perspective view of a pipe supporting device shown in FIG. 2.
Figure 4:
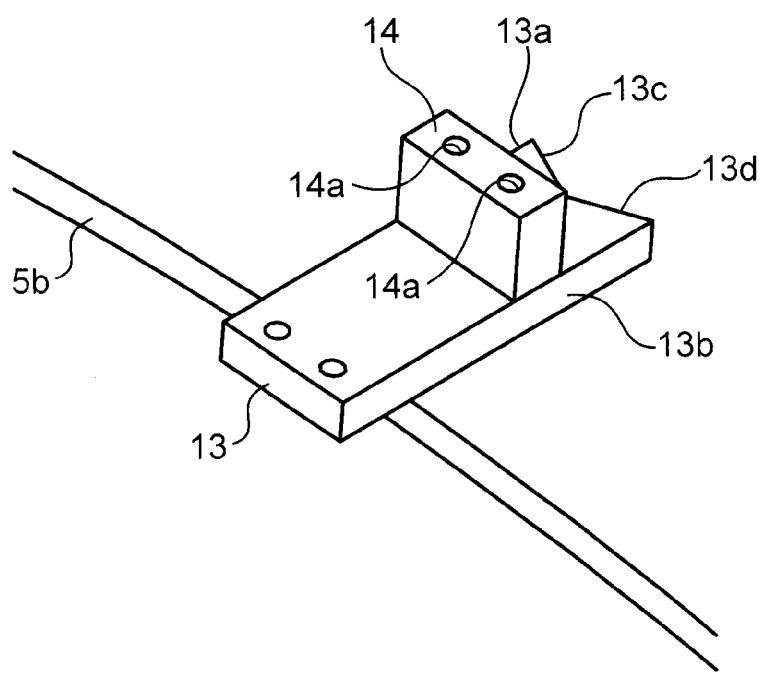
FIG. 4 is a perspective view of the pipe supporting device shown in FIG. 3 with a support portion thereof detached.

FIG. 3 is a perspective view showing an overall configuration of the pipe supporting device 12. FIG. 4 is a perspective view of the pipe supporting device shown in FIG. 3 with a support portion 15 thereof detached.

With reference to FIGS. 3 and 4, the pipe supporting device 12 includes the support portion 15 for supporting two hydraulic pipes 11 along respective axes D2 of the two hydraulic pipes 11, the axes extending along the length D1 of the boom 5, a weld portion 13 connected with an upper surface (outer surface) of the top plate 5b of the boom 5 by fillet welding, and a connecting stand 14 connecting the support portion 15 and the weld portion 13.

The support portion 15 includes a pair of upper and lower clamping plates 15a, buffers 15b respectively provided between the clamping plates 15a and each of the hydraulic pipes 11, and two bolts 15c securing the clamping plates 15a to the connecting stand 14.

The pair of clamping plates 15a includes a pair of opposite upper and lower clamping portions (not denoted by a reference numeral) which define spaces respectively corresponding to the cross section of each of the hydraulic pipes 11, and insertion holes (not shown) formed between the clamping portions to allow the bolts 15c to pass therethrough. The bolts 15c are inserted in the insertion holes from above and screwed into screw holes 14a (see FIG. 4) formed in the connecting stand 14 to thereby connect the clamping plates 15a to the connecting stand 14 with the hydraulic pipes 11 being sandwiched between the opposite clamping portions of the clamping plates 15a.

Each of the buffers 15b is provided between the inner surfaces of the clamping portions of the clamping plates 15a and the outer surface of the corresponding hydraulic pipe 11, to prevent the hydraulic pipes 11 from being damaged by the clamping portions.

Figure 5:
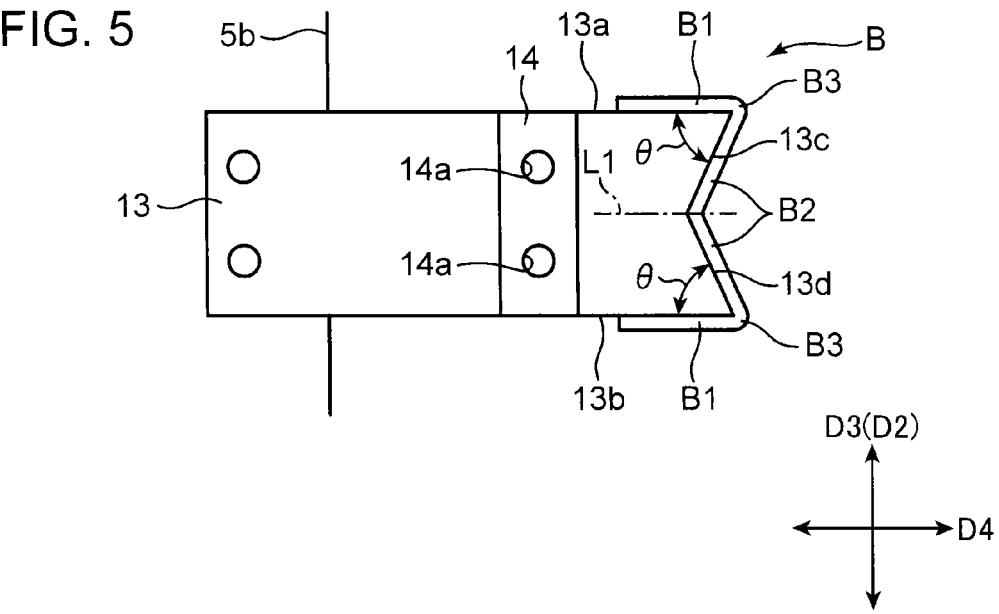
FIG. 5 is a plan view of the configuration shown in FIG. 4.
Figure 6:
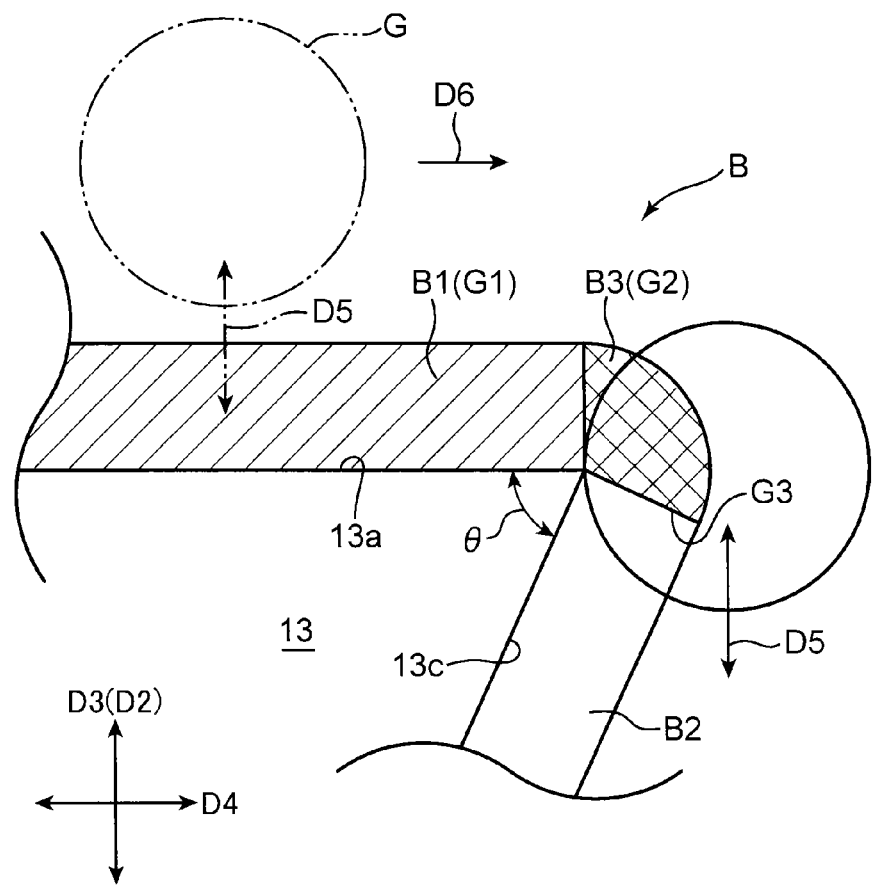
FIG. 6 is an enlarged plan view of a part of the configuration shown in FIG. 5.

As shown in FIGS. 5 and 6, the weld portion 13 is in the form of a metal plate and connected, by fillet welding, with the top plate 5b by means of a weld bead B formed between peripheral surfaces of the weld portion 13 and the upper surface of the top plate 5b of the boom 5.

For the fillet welding, the peripheral surfaces of the weld portion 13 stand on the top plate 5b and include a pair of opposite perpendicular standing surfaces 13a and 13b extending in a direction substantially perpendicularly intersecting the axes D2 of the hydraulic pipe 11, and a pair of oblique standing surfaces 13c and 13d extending from respective leading ends of the pair of opposite perpendicular standing surfaces 13a and 13b to join each other, each of the oblique surfaces 13c and 13d extending in a direction oblique to the axes D2 of the hydraulic pipe 11.

The respective leading ends of the opposite perpendicular standing surfaces 13a and 13b, which join the oblique standing surfaces 13c and 13d, respectively, are located at positions away from each of the axes D2 of the hydraulic pipes 11 the same distance in a direction (i.e. the second stress direction D4) perpendicularly intersecting the axes D2.

The oblique standing surface 13c joins the perpendicular standing surface 13a at an acute angle θ, and the oblique standing surface 13d also joins the perpendicular standing surface 13b at the acute angle θ. The angle θ is set at about 65 degrees.

The oblique standing surfaces 13c and 13d are flat and join each other to define an angle.

Further, the oblique standing surfaces 13c and 13d are symmetrically disposed with respect to a straight line L1 through which a plane passing the middle between the pair of opposite perpendicular standing surfaces 13a and 13b and perpendicularly intersecting the axes D2 of the hydraulic pipes 11 passes. In other words, the oblique standing surfaces 13c and 13d have the same length and are disposed at the same angle.

The above-described pipe supporting device 12 is connected to the boom 5 by fillet welding, for example, as described below.

In order to support the hydraulic pipes 11 along their axes D2 (see FIG. 2) of the hydraulic pipes 11, the weld portion 13 is disposed on the top plate 5b of the boom 5 in such a way that the opposite perpendicular standing surfaces 13a and 13b of the weld portion 13 perpendicularly intersect the first stress direction D3 on the top plate 5b. This allows the oblique standing surfaces 13c and 13d to be disposed obliquely to the first stress direction D3 and the second stress direction D4.

Here, one end of the weld portion 13 along the second stress direction D4 is located at an outer position than the widthwise middle of the top plate 5b in the second stress direction D4, and the other end of the weld portion 13 is located outwardly beyond the side end of the top plate 5b.

In this state, the weld portion 13 is connected to the top plate 5b by fillet welding (a weld bead B is formed) along the perpendicular standing surface 13a, the oblique standing surface 13c, the oblique standing surface 13d, and the perpendicular standing surface 13b over a range including the perpendicular standing surface 13a, the oblique standing surface 13c, the oblique standing surface 13d, and the perpendicular standing surface 13b.

Specifically, the weld bead B includes perpendicular portions B1 (the hatched portion in FIG. 6) respectively formed along the perpendicular standing surfaces 13a and 13b, oblique portions B2 (the blank portion in FIG. 6) respectively formed along the oblique standing surfaces 13c and 13d, and corner portions B3 (the cross-hatched portion in FIG. 6) respectively formed at each of the corner between the perpendicular standing surface 13a and the oblique standing surface 13c and the corner between the perpendicular standing surface 13b and the oblique standing surface 13d. The perpendicular portions B1 are respectively formed along a part of each of the perpendicular standing surfaces 13a and 13b, the part including the leading end.

In the case of forming the weld bead B in the manner described above, the strength of the weld is liable to be insufficient because the opposite perpendicular standing surfaces 13a and 13b perpendicularly intersect the first stress direction D3. Therefore, the perpendicular portions B1 need to be ground by a grinder G.

Further, stress concentration is liable to occur at the weld formed at each of the corner between the perpendicular standing surface 13a and the oblique standing surface 13c and the corner between the perpendicular standing surface 13b and the oblique standing surface 13d. Therefore, also the corner portions B3 need to be ground by the grinder G.

On the other hand, because the oblique standing surfaces 13c and 13d extend obliquely to both of the stress directions D3 and D4, the oblique portions B2 do not need to be ground.

As described above, a stress occurs in the top plate 5b of the boom 5 in the second stress direction D4, owing to the upward deformation of the top plate 5b at the middle portion thereof. Therefore, the stress in the second stress direction D4 increases as approaching the middle of the boom 5. Here, stress concentration is liable to occur at the weld also at the corner (hereinafter, also referred to as "inner corner") between the oblique standing surfaces 13c and 13d. However, the inner corner is more distant from the middle portion of the top plate 5b than each of the corners (hereinafter, also referred to as "outer corners") between the perpendicular standing surface 13a and the oblique standing surface 13c and between the perpendicular standing surface 13b and the oblique standing surface 13d. Therefore, the inner corner has a more favorable strength than the outer corners, which makes it possible to omit grinding of the weld also at the inner corner.

In view of the above, as shown in FIG. 6, a treatment G1 by the grinder G is performed on the perpendicular portions B1 and a treatment G2 by the grinder G is performed on the corner portions B3, a terminating end G3 of the treatment G2 being set at the boundary between the corner portion B3 and the oblique portion B2.

At this time, the grinder G is caused to move in the second stress direction D4 while reciprocating in the first stress direction D3 to thereby perform the treatments G1 and G2 on the perpendicular portions B1 and the corner portions B3, respectively.

Further, in order that the corner portion B3 joins the oblique portion B2 without a step at each of the terminating ends G3, a finishing treatment is performed on the terminating ends G3 by moving the grinder G in the first stress direction D3. Here, because the oblique standing surface 13c (13d) joins the perpendicular standing surface 13a (13b) at the acute angle in the weld portion 13, the oblique surface 13c (13d) is not located in the middle of the path of movement of the grinder G in the first stress direction D3. This allows the grinder G to perform the finishing treatment without making contact with the oblique standing surface 13c (13d).

Figure 7:
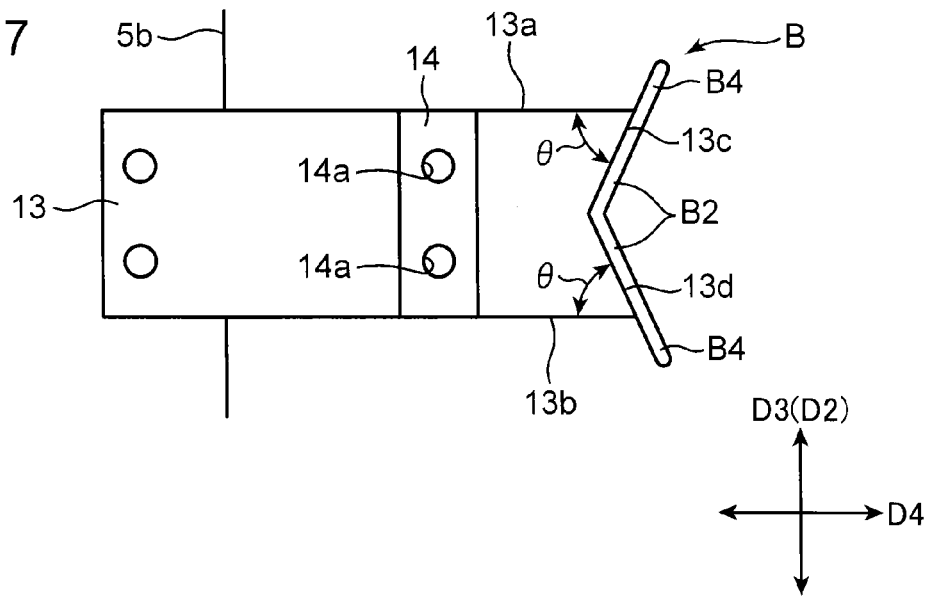
FIG. 7 is a diagram illustrating another welding method for the pipe supporting device in the first embodiment, FIG. 7 corresponding to FIG. 4.
Figure 8:
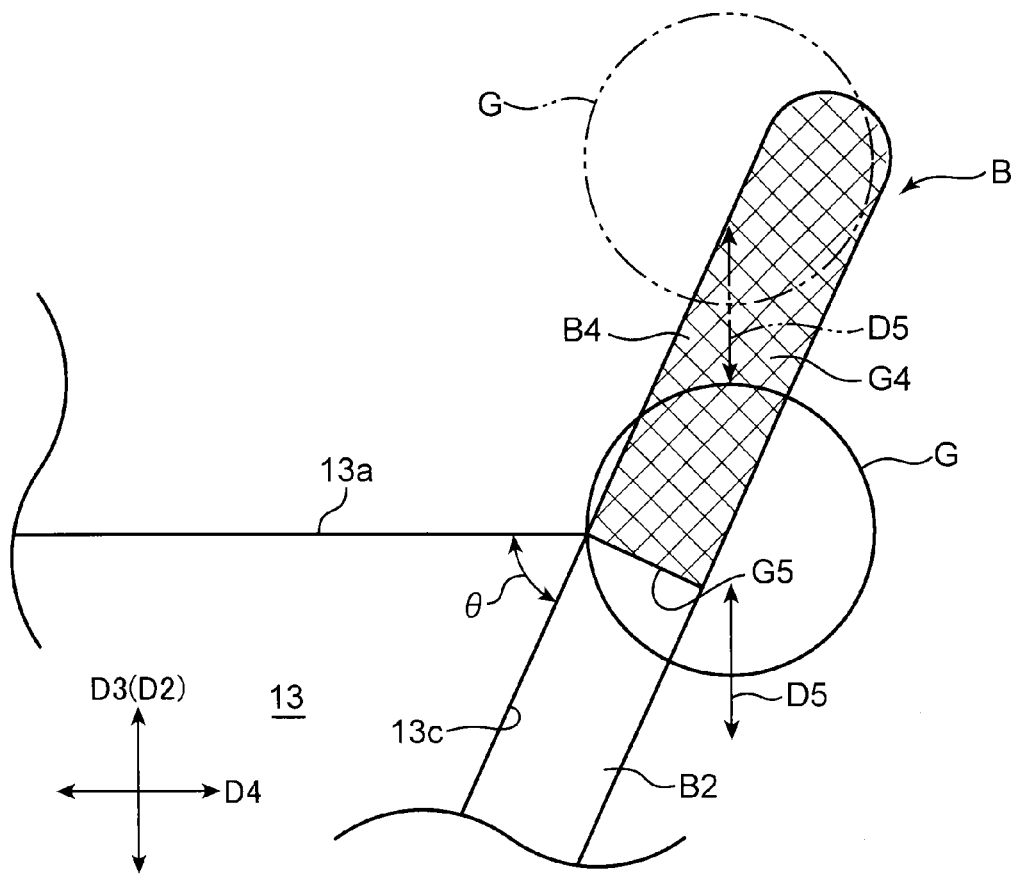
FIG. 8 is an enlarged plan view of a part of the configuration shown in FIG. 7.

A finishing treatment can be easily performed also in the case where the above-described pipe supporting device 12 is welded to the boom 5 in the manner shown in FIGS. 7 and 8.

A weld bead B shown in FIGS. 7 and 8 includes oblique portions B2 (the blank portion in FIG. 8) respectively formed along the oblique standing surfaces 13c and 13d, and extension portions B4 (the cross-hatched portion in FIG. 8) respectively extending from each of the oblique portions B2 beyond the corresponding one of the corner between the perpendicular standing surface 13a and the oblique standing surface 13c and the corner between the perpendicular standing surface 13b and the oblique standing surface 13d, the weld bead B having no such perpendicular portions B1 as described.

Each of the extension portions B4 includes a part protruding from the weld portion 13 to receive a concentrated stress, and another part contributing to the welding of the corresponding one of the corner between the perpendicular standing surface 13a and the oblique standing surface 13c and the corner between the perpendicular standing surface 13b and the oblique standing surface 13d. Accordingly, a treatment G4 by the grinder G is performed on the extension portions B4, and a terminating end G5 of the treatment G4 is set at the boundary between the extension portion B4 and the oblique portion B2.

In the same manner as the above-described case, the grinder G is reciprocatingly moved in the first stress direction D3 to thereby perform the treatment G4.

Further, in order that the oblique portion B2 joins the corresponding extension portion B4 without a step at each of the terminating ends G5, a finishing treatment is performed on the terminating ends G5 by moving the grinder G in the first stress direction D3. Also in this case, the oblique surface 13c (13d) is not located in the middle of the path of movement of the grinder G. Therefore, the finishing treatment can be easily performed.

However, a larger area can be secured for welding to allow a more favorable strength in the case shown in FIGS. 5 and 6 than in the case shown in FIGS. 7 and 8.

As described above, the oblique standing surfaces 13c and 13d join the perpendicular standing surfaces 13a and 13b at an acute angle, respectively. Therefore, the oblique surfaces 13c and 13d are not located in the middle of the path of movement when the grinder G is moved along the axes D2 (in the first stress direction D3) of the hydraulic pipes 11 to perform the treatment G2 on the corner portions B3. This allows the grinder G to perform the finishing treatment on the terminating ends of the grinding, without making contact with the oblique standing surfaces 13c and 13d.

Therefore, it is possible to easily perform the finishing treatment on the terminating ends of the grinding performed on the weld formed on the boom 5.

According to the first embodiment, the following advantageous effects can be provided.

The oblique standing surfaces 13c and 13d have the same length and are disposed at the same oblique angle. This is effective to decentralize a stress occurring at the welds respectively formed at the oblique standing surfaces 13c and 13d.

Therefore, it is possible to secure a sufficient strength of the weld formed at the oblique standing surfaces 13c and 13d without performing grinding thereon by the grinder G.

Second Embodiment

Figure 9:
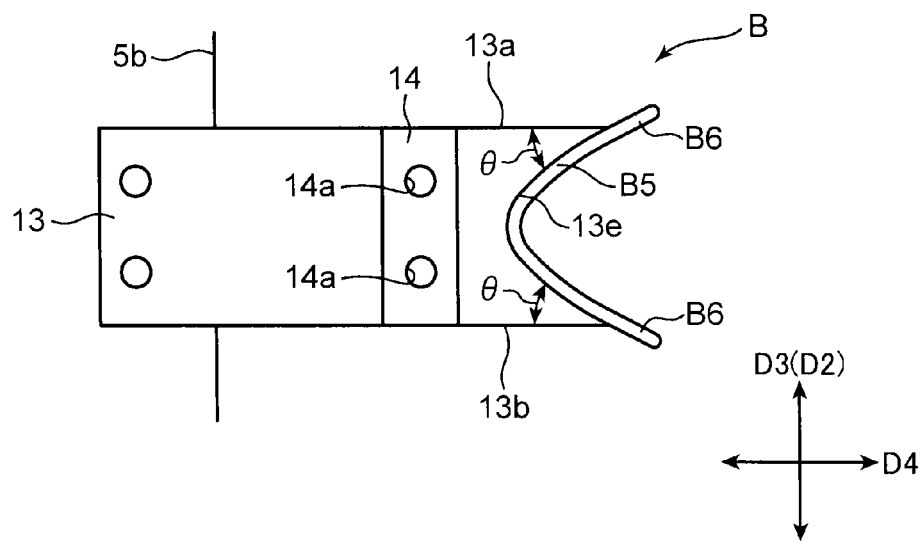
FIG. 9 is a diagram showing a pipe supporting device according to a second embodiment of the present invention, FIG. 9 corresponding to FIG. 7.
Figure 10:
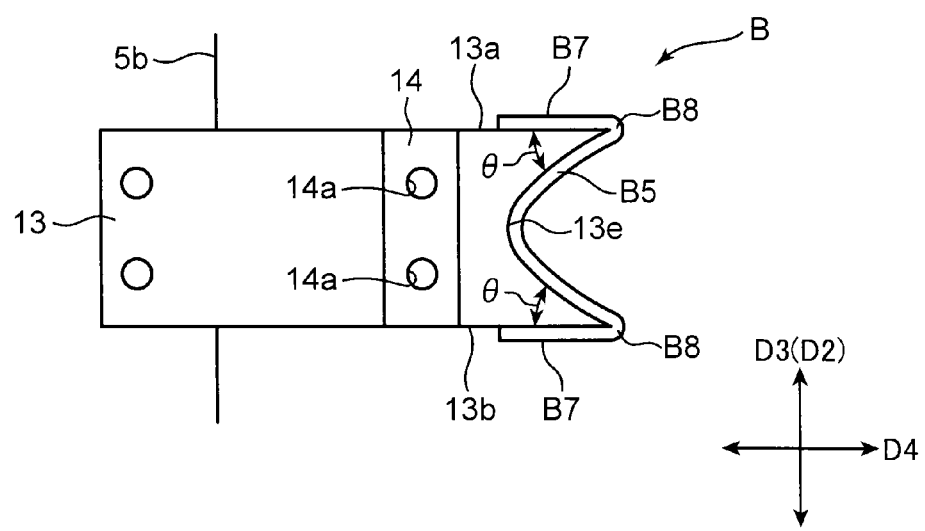
FIG. 10 is a diagram illustrating another welding method for the pipe supporting device in the second embodiment.
Figure 11:
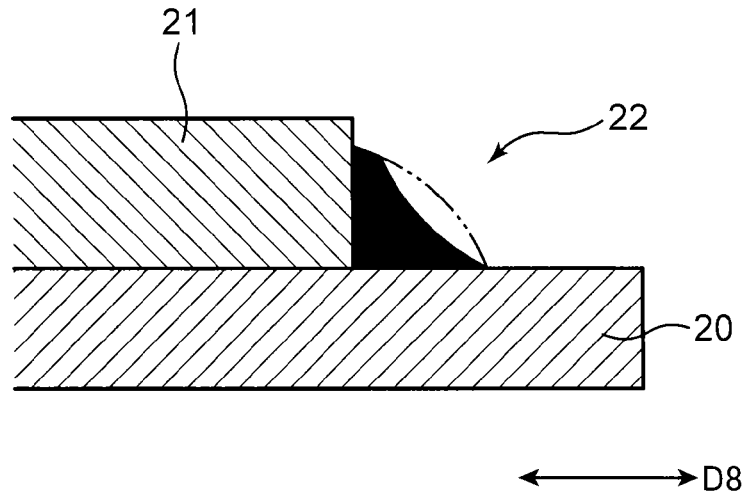
FIG. 11 is a sectional view illustrating a state of an arm and a plate of a pipe supporting device connected with each other by welding which is disclosed in Patent Literature 1.
Figure 12:
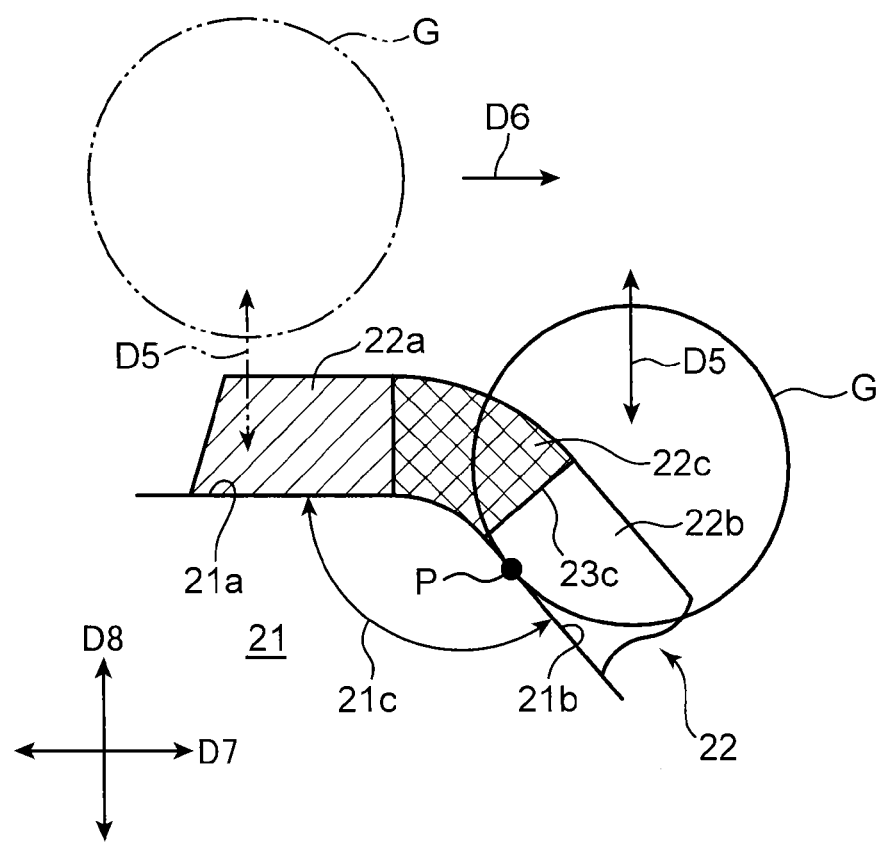
FIG. 12 is an enlarged plan view of a part of the weld between the arm and the plate of the pipe supporting device which is disclosed in Patent Literature 1.

FIGS. 9 and 10

In the first embodiment, the pair of oblique standing surfaces 13c and 13d of the weld portion 13 join each other to define an angle. However, a pair of oblique standing surfaces may include respective curved portions joining each other, as illustrated as a second embodiment.

Specifically, a weld portion 13 according to the second embodiment includes a curved standing surface 13e connecting respective leading ends of perpendicular standing surfaces 13a and 13b. The curved standing surface 13e is parabolic in a plan view.

Specifically, the curved standing surface 13e has an oblique portion (not denoted by a reference numeral) joining the perpendicular standing surface 13a at an acute angle, another oblique portion (not denoted by a reference numeral) joining the perpendicular standing surface 13b at an acute angle, and a connecting portion (not denoted by a reference numeral) located between the oblique portions, the connecting portion consisting of joining curved portions.

A pipe supporting device according to the second embodiment can be connected to the boom 5 by fillet welding in the manner described below.

As shown in FIG. 9, it is possible to connect the weld portion 13 to the top plate 5b by means of a weld bead B including a curved portion B5 formed along the curved standing surface 13e, and extension portions B6 respectively extending from opposite ends of the curved portion B5 beyond the corner between the curved standing surface 13e and each of the perpendicular standing surfaces 13a and 13b. In this case, similarly to the above-described case shown in FIG. 8, a terminating end of a treatment performed by the grinder G is set at the boundary between the curved portion B5 and each of the extension portions B6. Therefore, a finishing treatment can be easily performed on the terminating ends.

Further, as shown in FIG. 10, it is possible to connect the weld portion 13 to the top plate 5b by means of a weld bead B including a curved portion B5 formed along the curved standing surface 13e, perpendicular portions B7 respectively formed along the perpendicular standing surfaces 13a and 13b, and corner portions B8 respectively formed between the curved portion B5 and each of the perpendicular portions B7. In this case, similarly to the above-described case shown in FIG. 6, a terminating end of a treatment performed by the grinder G is set at the boundary between the perpendicular portion B7 and the corner portion B8. Therefore, a finishing treatment can be easily performed on the terminating ends.

According to the second embodiment, in the curved standing surface 13e, one oblique portion joins another oblique portion via the curved connecting portion, which ensures a gradual change in angle. This makes it possible to reduce the stress concentration at the joining portion, compared to the case where the oblique standing surfaces join each other at a definite angle.

The present invention is not limited to the above-described embodiments and the following modifications may be adopted.

In the above-described embodiments, each of the perpendicular standing surfaces 13a and 13b joins the corresponding one of the oblique standing surfaces 13c and 13d or the curved standing surface 13e at a definite angle. However, the perpendicular standing surfaces 13a and 13b, and the oblique standing surfaces 13c, 13d or the curved standing surface 13e may be modified to include respective curved portions at their respective joining portions.

In the above-described embodiments, the pipe supporting device 12 is connected to the boom 5 by fillet welding. However, the pipe supporting device 12 may be mounted to the arm 6.

In the above-described embodiments, the respective leading ends of the perpendicular standing surfaces 13a and 13b are located at positions away from each of the axes D2 of the hydraulic pipe 11 in the second stress direction D4. However, the configuration may be modified so that the leading end of the perpendicular standing surface 13a is disposed at a different position. In this state, it is possible to set the respective oblique angles of the oblique standing surfaces 13c and 13d so that the oblique standing surfaces 13c and 13d have the same length. On the other hand, it is also possible to set the joining point of the oblique standing surfaces 13c and 13d so that the oblique standing surfaces 13c and 13d have different lengths but have the same oblique angle.

The configuration that the oblique standing surfaces include respective curved portions joining each other has been illustrated by the curved standing surface 13e. However, the configuration may be modified so that flat oblique standing surfaces 13c and 13e include respective curved portions at their respective joining ends.

The above-described specific embodiments mainly include the invention configured as follows.

The present invention provides a pipe supporting device for use in a construction machine including a machine body, an attachment mounted on the machine body pivotably around a horizontal axis, and a hydraulic pipe extending along a length of the attachment, the pipe supporting device comprising: a support portion for supporting the hydraulic pipe along an axis of the hydraulic pipe extending along the length of the attachment; and a weld portion joining the support portion and to be connected with an outer surface of the attachment by fillet welding, wherein the weld portion has a plurality of peripheral surfaces standing on the outer surface of the attachment for the fillet welding, the plurality of peripheral surfaces including: a pair of opposite perpendicular standing surfaces extending in a direction substantially perpendicularly intersecting the axis of the hydraulic pipe; and a pair of oblique standing surfaces extending from respective leading ends of the pair of opposite perpendicular standing surfaces to join each other, each of the oblique surfaces extending in a direction oblique to the axis of the hydraulic pipe and joining the corresponding perpendicular standing surface at an acute angle.

In the present invention, the axis of the hydraulic pipe extending along the length of the attachment extends in a direction of a stress occurring in the attachment. Because each of the pair of oblique standing surfaces extends obliquely to the stress direction, the connecting of the oblique standing surfaces to the attachment by welding allows the pipe supporting device to be secured on the attachment with the weld having a sufficient strength against the stress.

Further, because the strength of weld can be secured in this way, the weld formed between the oblique standing surfaces and the attachment does not need to be ground by a grinder.

On the other hand, stress concentration is liable to occur at the weld formed between the corners between the pair of perpendicular standing surfaces and the pair of oblique standing surfaces, and the attachment. Therefore, the weld formed at each of the corners needs to be ground by the grinder.

Accordingly, in the case where the pipe supporting device according to the present invention is connected to the attachment by welding, a terminating end of the grinding performed by the grinder is set at the boundary between the weld formed at each of the corners and the weld formed at the corresponding oblique standing surface.

Here, the grinding of the weld formed at each of the corners is performed by reciprocatingly moving the grinder along the axis of the hydraulic pipe (in the direction perpendicularly intersecting the perpendicular standing surfaces).

In the present invention, each of the oblique standing surfaces joins the corresponding perpendicular standing surface at an acute angle. Therefore, the oblique surfaces are not located in the middle of the path of movement when the grinder is moved along the axis of the hydraulic pipe to perform a treatment on the weld formed at each of the corners. This allows the grinder to perform a finishing treatment on the terminating ends of the grinding, without making contact with the oblique standing surfaces.

Therefore, according to the present embodiment, it is possible to easily perform a finishing treatment on a terminating end of grinding performed on a weld formed on an attachment.

In the present embodiment, it should be noted that the expression "each of the oblique standing surfaces joins the corresponding perpendicular standing surface at an acute angle" includes not only a configuration where an oblique standing surface joins a perpendicular standing surface at a definite angle, but also a configuration where an oblique standing surface and a perpendicular standing surface join each other curvedly or without a definite angle.

Here, even if the pair of oblique standing surfaces differ from each other in at least one of length and oblique angle, the above-described advantageous effects can be obtained as long as each of the oblique standing surface joins the corresponding perpendicular standing surface at an acute angle. However, in this case, because the pair of oblique standing surfaces differ from each other in length or oblique angle, stress concentration is liable to occur at one of the welds respectively formed at each of the oblique standing surfaces.

Accordingly, in the above-described pipe supporting device, it is preferred that the respective leading ends of the pair of opposite perpendicular standing surfaces are located at positions away from the axis of the hydraulic pipe the same distance in the direction perpendicularly intersecting the axis of the hydraulic pipe, and that the pair of oblique standing surfaces are symmetrically disposed with respect to a joint line through which a plane passing a middle between the pair of opposite perpendicular standing surfaces and perpendicularly intersecting the axis of the hydraulic pipe passes.

According to this configuration, the pair of oblique standing surfaces have the same length and are disposed at the same oblique angle. This is effective to decentralize a stress occurring at the welds formed at the oblique standing surfaces.

Therefore, it is possible to secure a sufficient strength of the weld formed at the oblique standing surfaces without performing grinding thereon by the grinder.

Here, the pair of oblique standing surfaces may join each other at a definite angle. However, in this case, stress concentration is liable to occur at the weld formed at the angle.

Accordingly, in the above-described pipe supporting device, it is preferred that the pair of oblique standing surfaces include respective curved portions joining each other.

According to this configuration, one oblique standing surface joins another oblique standing surface at gradually changing angles. This makes it possible to reduce stress concentration at the joining portion, compared to the case where the oblique standing surfaces join each other at a definite angle.

This application is based on Japanese Patent application No. 2014-127950 filed in Japan Patent Office on Jun. 23, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A pipe supporting device for use in a construction machine including a machine body, an attachment mounted on the machine body pivotably around a horizontal axis, and a hydraulic pipe extending along a length of the attachment, the pipe supporting device comprising:
    a support portion for supporting the hydraulic pipe along an axis of the hydraulic pipe extending along the length of the attachment; and
    a weld portion joining the support portion and to be connected with an outer surface of the attachment by fillet welding, wherein
    the weld portion has a plurality of peripheral surfaces standing on the outer surface of the attachment for the fillet welding, the plurality of peripheral surfaces including:
        a pair of opposite perpendicular standing surfaces extending in a direction substantially perpendicularly intersecting the axis of the hydraulic pipe; and
        a pair of oblique standing surfaces extending from respective leading ends of the pair of opposite perpendicular standing surfaces to join each other,
    each of the oblique standing surfaces extending in a direction oblique to the axis of the hydraulic pipe and joining the corresponding perpendicular standing surface at an acute angle.

2. A pipe supporting device according to claim 1, wherein the respective leading ends of the pair of opposite perpendicular standing surfaces are located at positions away from the axis of the hydraulic pipe the same distance in the direction perpendicularly intersecting the axis of the hydraulic pipe, and
    the pair of oblique standing surfaces are symmetrically disposed with respect to a joint line through which a plane passing a middle between the pair of opposite perpendicular standing surfaces and perpendicularly intersecting the axis of the hydraulic pipe passes.

3. A pipe supporting device according to claim 1, wherein the pair of oblique standing surfaces include respective curved portions joining each other.

4. A construction machine comprising:
    a machine body;
    an attachment mounted on the machine body pivotably around a horizontal axis;
    a hydraulic pipe extending along a length of the attachment;
    a pipe supporting device; and
    a weld bead for connecting the pipe support device to an outer surface of the attachment by fillet welding,
    wherein the pipe supporting device comprises:
        a support portion for supporting the hydraulic pipe along an axis of the hydraulic pipe extending along the length of the attachment; and
        a weld portion joining the support portion and to be connected with the outer surface of the attachment by fillet welding,
    wherein the weld portion has a plurality of peripheral surfaces standing on the outer surface of the attachment for the fillet welding, the plurality of peripheral surfaces including:
        a pair of opposite perpendicular standing surfaces extending in a direction substantially perpendicularly intersecting the axis of the hydraulic pipe; and
        a pair of oblique standing surfaces extending from respective leading ends of the pair of opposite perpendicular standing surfaces to join each other, each of the oblique standing surfaces extending in a direction oblique to the axis of the hydraulic pipe and joining the corresponding perpendicular standing surface at an acute angle, and
    the weld bead includes oblique portions respectively formed along the oblique standing surfaces, and parts contributing to the welding of portions where each of the perpendicular standing surfaces and the corresponding one of the oblique standing surfaces join, the portions being given a treatment by a grinder.

5. The construction machine according to claim 4, wherein the respective leading ends of the pair of opposite perpendicular standing surfaces are located at positions away from the axis of the hydraulic pipe the same distance in the direction perpendicularly intersecting the axis of the hydraulic pipe, and the pair of oblique standing surfaces are symmetrically disposed with respect to a joint line through which a plane passing a middle between the pair of opposite perpendicular standing surfaces and perpendicularly intersecting the axis of the hydraulic pipe passes.

6. The construction machine according to claim 4, wherein the pair of oblique standing surfaces include respective curved portions joining each other.

7. The construction machine according to claim 4, wherein the parts of the bead are ground from a toe of weld of the bead by the treatment so that a cross-sectional area of the parts of the bead gradually increases in the direction substantially perpendicularly intersecting the axis of the hydraulic pipe.

* * * * *